C. R. TAYLOR.
Apparatus for Steaming Grain.
No. 157,706.  Patented Dec. 15, 1874.
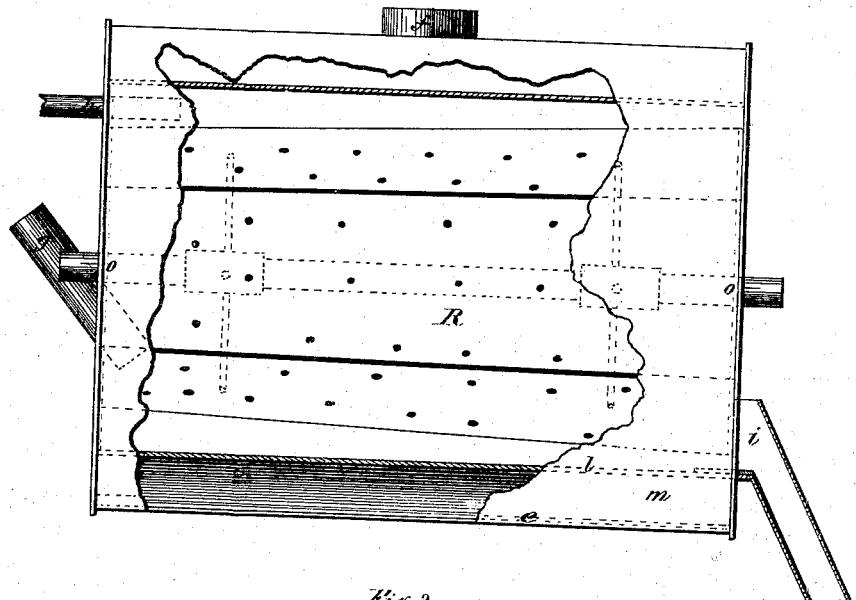
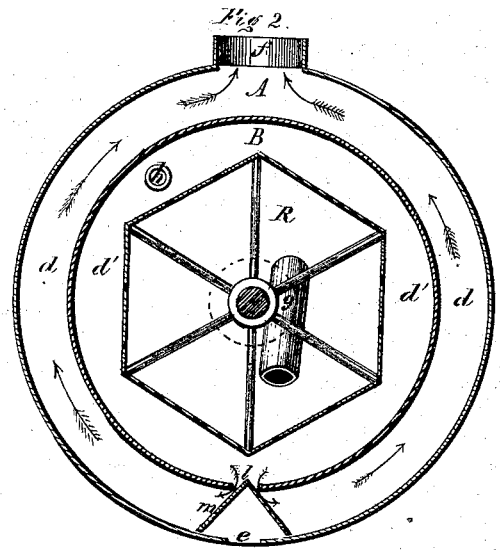
WITNESSES.  INVENTOR.

UNITED STATES PATENT OFFICE.

CARLO R. TAYLOR, OF IONIA, MICHIGAN, ASSIGNOR OF TWO-THIRDS HIS RIGHT TO FREDERICK HALL, LAMMON B. TOWNSEND, HENRY P. TAYLOR, AND JOHN C. TAYLOR, OF SAME PLACE.

IMPROVEMENT IN APPARATUS FOR STEAMING GRAIN.

Specification forming part of Letters Patent No. 157,706, dated December 15, 1874; application filed November 5, 1874.

*To all whom it may concern:*

Be it known that I, C. R. TAYLOR, of Ionia, in the county of Ionia and State of Michigan, have invented certain new and useful Improvements in Apparatus for Steaming Grain; and I do hereby declare the following to be a full, clear, and exact description of the invention, such as will enable others skilled in the art to which it pertains to make and use it, reference being had to the accompanying drawings, which form part of this specification.

My invention relates to an improvement in an apparatus for steaming grain; and consists in the arrangement and combination of devices, hereafter more fully shown and described.

The accompanying drawing represents my invention.

A represents the outside chamber, by which the inner chamber B is surrounded, leaving an intermediate space, $d$, between them. At the lower side of the chamber A is an opening, $e$, which extends from one end to the other, for the escape of water from condensed steam, and at the top is an escape-pipe, $f$, of considerable width, in order to create a strong current within the space between the chambers, so as to prevent condensation as much as possible. At one end or head of the chamber A are two pipes, the larger one, $g$, for the introduction of grain into the reel R, and the other, $h$, for the admission of steam into the space $d'$ between the inner chamber and the reel R. At the opposite end of the chamber A, at its lower edge, is a large pipe, $i$, out of which the grain passes after having been subjected to the heat of the steam. The chambers are closed by one common head at each end, so that the space $d$, surrounding the inner chamber, does not extend beyond its sides. There is in the lower part of the inner chamber B an opening, $l$, extending the whole length of the chamber directly over the opening $e$ in the outer chamber A, and in the intervening space, attached to the ends of the inner chamber, is a shield, $m$, of a V-shape, so as to prevent steam from rushing through the opening $e$ underneath, and to lead it into the space $d$, whence it escapes through escape-pipe $f$. The reel R is journaled in both ends of the chambers at $o$, and extends from one end to the other, increasing in diameter from the end where the steam and grain are introduced toward the other, where the grain is to pass out through the pipe $i$. This increase of diameter is given to the reel for the purpose of forming an inclined plane within the reel, the lower end of which, although rotating, is constantly in front of the inside opening of the pipe $i$, which forms the outlet for grain. The sides of the reel are perforated to allow the steam to circulate freely through the grain, which is kept in motion as long as the reel rotates.

The steam, being confined between the chambers and constantly renewed just in proportion to its escape, keeps an even temperature in the inner chamber, and the grain, being thus acted upon uniformly, turns out better in quality than it would otherwise.

Having thus described my invention, I claim—

In an apparatus for steaming grain, the combination of the chamber A, with its opening $e$, for the escape of condensed steam, chamber B, with its opening $l$, reel R, the pipes $f$ $g$ $h$ $i$, and the shield $m$, substantially as shown and described.

In testimony that I claim the foregoing I have hereunto set my hand this 28th day of October, 1874.

CARLO R. TAYLOR.

Witnesses:
STEPHEN F. PAGE,
P. H. TAYLOR.